United States Patent [19]

Lovelace et al.

[11] 4,122,833

[45] Oct. 31, 1978

[54] NON-TRACKING SOLAR ENERGY COLLECTOR SYSTEM

[76] Inventors: Alan M. Lovelace, Acting Administrator of the National Aeronautics and Space Administration, with respect to an invention of; M. Kudret Selcuk, La Canada, Calif.

[21] Appl. No.: 801,452

[22] Filed: May 27, 1977

Related U.S. Application Data

[63] Continuation-in-part of Ser. No. 765,139, Feb. 3, 1977, Pat. No. 4,091,798.

[51] Int. Cl.² ............................................. F24J 3/02
[52] U.S. Cl. ............................... 126/271; 126/270; 350/288; 350/299
[58] Field of Search ............... 126/270, 271; 237/1 A; 350/292, 293, 288, 299; 165/171

[56] References Cited

U.S. PATENT DOCUMENTS

| 3,227,153 | 1/1966 | Godel et al. | 126/271 |
| 3,923,039 | 12/1975 | Falbel | 126/271 |
| 4,038,964 | 8/1977 | Drew | 126/271 |

FOREIGN PATENT DOCUMENTS 2,303,251  10/1976  France ................................. 126/271

*Primary Examiner*—Kenneth W. Sprague
*Assistant Examiner*—James C. Yeung
*Attorney, Agent, or Firm*—Monte F. Mott; John R. Manning; Wilfred Grifka

[57] ABSTRACT

A solar energy collector system characterized by an improved concentrator for directing incident rays of solar energy on parallel strip-like segments of a flat-plate receiver and a plurality of individually mounted reflector modules of a common asymmetrical triangular cross-sectional configuration supported for independent reorientation and defining a plurality of asymmetric vee-trough concentrators for deflecting incident solar energy toward the receiver.

1 Claim, 8 Drawing Figures

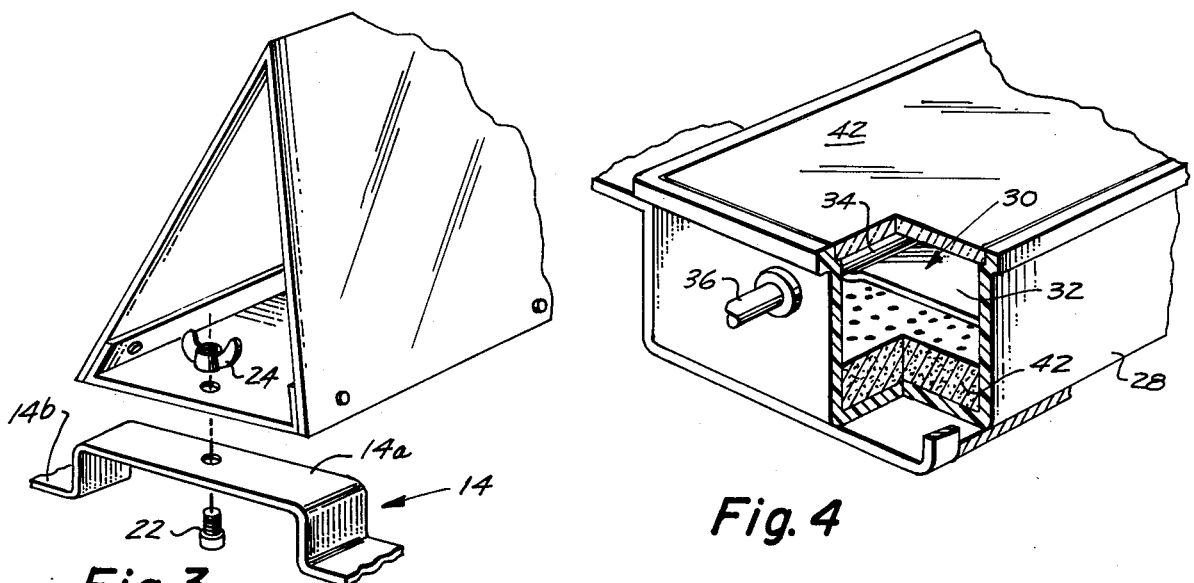
Fig. 3
Fig. 4
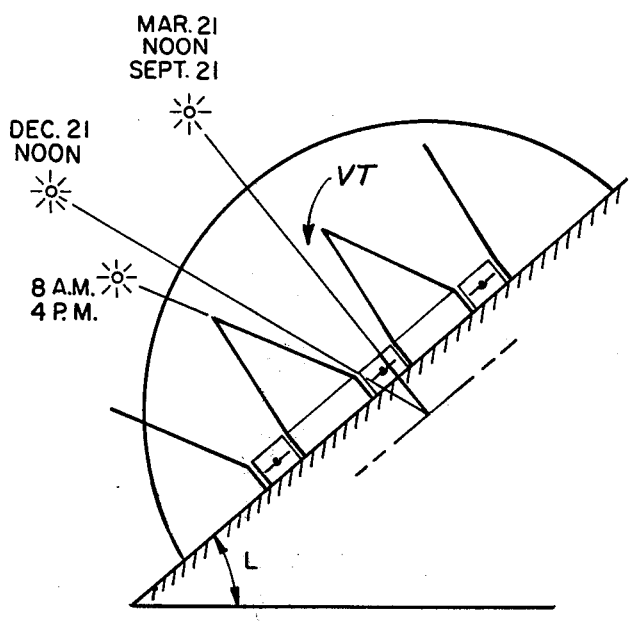
Fig. 5A
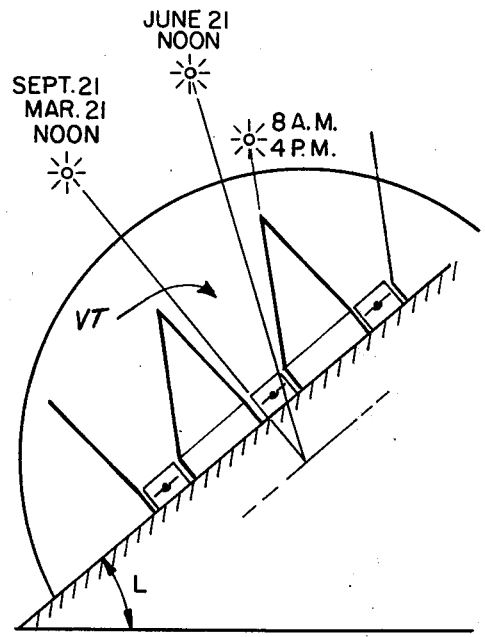
Fig. 5B
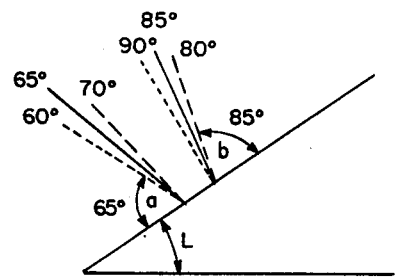
Fig. 6

NON-TRACKING SOLAR ENERGY COLLECTOR SYSTEM

ORGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 USC 2457).

CROSS REFERENCE

This application is a Continuation-in-Part of U.S. patent application Ser. No. 765,139, filed Feb. 3, 1977, now U.S. Pat. 4,091,798.

BACKGROUND OF THE INVENTION

1. Field of the Invention

The invention generally relates to non-tracking solar energy collector systems and more particularly to a collector system characterized by an improved solar energy concentrator characterized by a plurality of independently supported asymmetric reflector modules for directing incident beams of solar energy on elongated strip-like segments of a flat-plate receiver arranged in mutually spaced parallelism.

2. Description of the Prior Art

Currently, substantial quantities of time and funds are being devoted to a search for sources of energy which can be utilized economically and efficiently in order that dependence on more conventional sources of energy, such as fossil fuels, may be reduced.

It has long been recognized that the sun provides a substantially endless source of solar energy. For example, it has long been appreciated that solar energy may be collected and stored in forms such as heat. Moreover, systems employed in collecting solar energy are considered to be simple and economic, both in terms of fabrication and maintenance. These recognized advantages have led many investigators toward further development of solar energy collector systems having enhanced capabilities for collecting solar energy and converting the collected solar energy to usable forms of energy.

The future success of solar energy collector systems is believed by many to be dependent in large measure upon the availability of low-cost, efficient collector systems. Vacuum insulated tube-type collectors are disclosed in U.S. Pat. No. 4,091,798. While vacuum insulated tube-type collectors which minimize thermal losses have been employed with success, high costs impair their use for domestic purposes, such as heating, absorption, refigeration and the like.

Moreover, collector systems for domestic uses must be reliable in their performance, require little maintenance, be relatively economic to fabricate, operate and maintain, and, finally, they must be characterized by high strength-to-weight ratios which facilitate a mounting thereof in domestic use environments, such as on roofs of homes and the like.

Consequently, attempts continuously are being made to improve fixed collectors and/or to reduce the costs thereof. Since non-tracking, flat-plate collectors do not require tracking or tilting, they may be said to represent the lowest capital cost per square foot of collector surface available for conversion of solar energy. The performance, unfortunately, of currently available flat-plate collectors tends to be relatively poor at elevated temperatures due to excessive heat loss from the absorber plates employed.

Among the various approaches taken in reducing radiation losses from absorber plates of flat-plate collectors is to reduce the heat loss coefficient. This has been achieved primarily by use of multiple of glazings and selective absorbers. Multiple glazings are useful but tend to reduce total transmissivity as well as increase costs. It is known that convection losses, on the other hand, can be suppressed by using honeycomb suppressors or by providing evacuated chambers between the absorber plate and a transparent cover normally provided therefor.

Unfortunately, the use of honeycomb cells tends to reduce the incoming flux by absorption and, also, increases the backward conduction. Moreover, there are potential problems inherent in plastic honeycomb materials and, of course, glass honeycombs are excessively expensive.

Reduction of convective losses through a use of evacuated chambers requires the use of good seals in order to maintain the required levels of vacuum during the lifetime of the system within which the seals are employed. Such seals are, of course, often difficult to maintain. Furthermore, it should be appreciated that for flat-plate collectors of customary dimensions, a transparent cover must be supported by suitable members, referred to as pegs, in order to eliminate stress-induced cracking resulting from forces occurring due to atmospheric pressures. These pegs, unfortunately, also tend to increase conduction losses. Furthermore, even though plastic covers offer some advantages over glass, from a stress standpoint, operational problems such as scratching, distortion and even melting under static conditions and degassing under vacuum are encountered.

Recently, evacuated tube collectors using borosilicate glass tubes have been suggested for use in non-tracking solar heat collector systems. Moreover, glass-to-metal vacuum seals apparently capable of being employed over long periods of time, without experiencing undesirable degradation, have been employed with these tube collectors. As a consequence, vacuum tubes tend to present a number of advantages over conventional flat-plate designs, from both a thermal performance and a longevity viewpoint. Unfortunately, however, when employed in non-tracking flat-plate systems, the economic costs of vacuum tubes are substantially greater than those of conventional flat-plate systems and thus render the resulting energy excessively expensive, which cannot be justified for domestic purposes.

Since no existing systems has provided a practical solution to the problem of providing for satisfactory cost effectiveness in systems capable of converting solar energy to more usable energy forms, in practical quantities, there currently exists a need for a non-tracking solar energy system which is simple and economic to fabricate, substantially efficient in operation and characterized by low initial and operational costs.

OBJECTS AND SUMMARY OF THE INVENTION

It is an object of the instant invention to provide an improved solar energy collector system which overcomes the aforementioned difficulties and disadvantages.

It is another object to provide in a solar energy collector system a non-tracking, non-tilting solar energy concentrator having year-round operational capabilities.

It is another object to provide in a non-tracking solar energy collector system a durable flat-plate collector having a capability for heating liquids at relatively low costs.

It is another object to provide in a lightweight, relatively efficient non-tracking, non-tilting solar energy collector system an energy concentrator having both diurnal and annual operational capabilities and characterized by low economic costs.

These and other objects and advantages are achieved through the use of a solar energy concentrator having a plurality of individually reversible reflector modules, of a common asymmetrical triangular cross-sectional configuration, dispersed in a uniform array characterized by adjacent reflector surfaces disposed in inclined planes converging beneath the plane of a coplanar array of permanently mounted juxtaposed strip-like segments of a flat-plate collector configured to conduct a fluid, such as water or the like, along a serpentine path between the reflector surfaces of the modules.

BRIEF DESCRIPTION OF THE DRAWINGS

FIG. 3 is an exploded, partially fragmented perspective view of one of a plurality of reflector modules which functions as an energy concentrator within the system shown in FIG. 1.

FIG. 4 is a fragmented perspective view of a segment of the solar energy receiver.

FIGS. 5A and 5B are diagrammatic views which illustrate, collectively, the solar aspect for successive seasons of an annual cycle.

FIG. 6 is a graphic view depicting a series of different aspect angles for adjacent reflector surfaces for the modules of the system shown in FIG. 1.

DESCRIPTION OF THE PREFERRED EMBODIMENT

Figure 1:
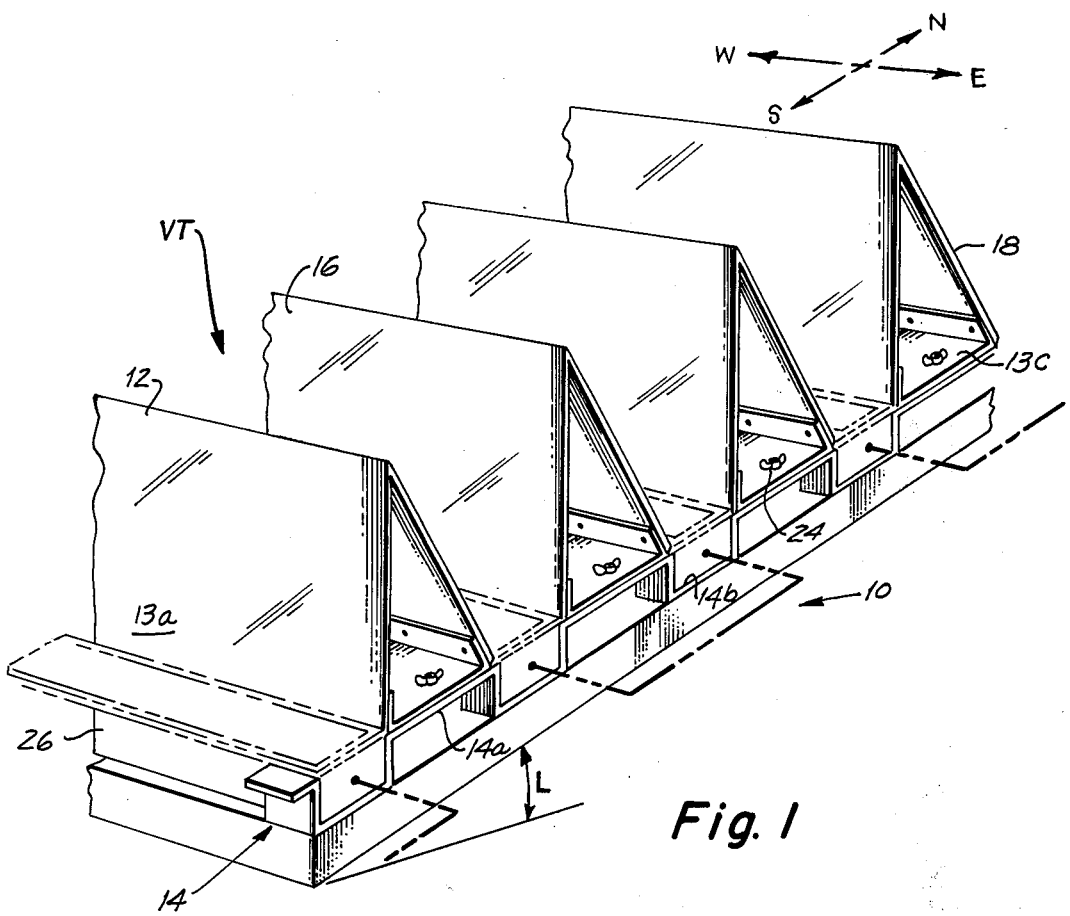
FIG. 1 is a fragmented perspective view of a solar energy collector system embodying the principles of the instant invention.

Referring now to the drawings with more particularity, wherein like reference characters designate like or corresponding parts throughout the several views, there is illustrated in FIG. 1 a non-tracking, non-tilting solar energy collector system, generally designated 10, which embodies the principles of the instant invention.

The system 10 is of lightweight construction and is particularly suited for use when mounted on rooftops of buildings such as dwellings and the like. It is to be understood that when the system is so employed, it is tilted to latitude indicated by the angle L in FIGS. 1 and 6. It is also important to appreciate that since the system 10 is particularly suited for use atop roofs and the like, it is desirable that the system possess a good strength-to-weight ratio as well as to be efficient in its collection and conversion of solar energy.

As shown, the system 10 includes a receiver panel, generally designated 11, and a vee-trough energy concentrator comprising a plurality of individual modules 12. The modules 12 are of a common asymmetric triangular cross-sectional configuration and are arranged in similarly ordered spaced parallelism for forming vee-troughs VT therebetween.

In practice, the modules 12 are formed from a lightweight material, such as aluminum and the like, utilizing conventional fabricating techniques fully understood by those familiar with the sheet metal industry. Each of the modules 12 includes side panels 13a, 13b and a base panel 13c arranged in intercepting relation. Due to the resulting triangular configuration of the modules, each is characterized by an exceptionally good strength-to-weight ratio. Thus the system is particulaly adapted for use on rooftops of dwellings and the like.

Each of the modules 12 is releasably supported at its opposite ends by a pair of lands 14a formed in brackets, generally designated 14, and separated by sockets 14b. Each of the modules 12 is provided with reflecting surfaces, designated 16 and 18. While the reflecting surfaces 16 and 18, as shown, comprise highly polished metallic surfaces, it is to be understood that, where desired, these surfaces are formed through a suitable use of reflectors comprising sheets of reflective Mylar bonded to said side plates 13a and 13b and the like.

It is important to appreciate that since the modules 12 are of asymmetrical configurations, the included angles defined between the planes of the reflecting surfaces 16 and 18, hereinafter referred to as aperture angles, are asymmetric with respect to planes perpendicularly oriented with respect to the plane of the system 10. As illustrated in FIGS. 1, 3, 5A and 5B, the aperture angles are tilted with respect to the plane of the system, in north-south directions. In order to facilitate reorientation of the aperture angles defined between the surfaces 16 and 18, each module is mounted on the brackets 14, utilizing screws 22 which extend through coaxially aligned apertures formed in the bracket and the base plate 13c. Wing nuts 24 are used for securing the screws 22 in place so that by loosening the nuts 24, manually, removal and remounting of each of the modules 12 on the brackets 14, is facilitated. Thus selective reorientation of the tilt of the aperture angles is facilitated.

It should be understood that the receiver panel 11 comprises a plurality of interconnected parallel segments, designated 26, of strip-like configurations arranged in mutually spaced parallelism. Each of the segments 26 of the panel 11 includes an elongated absorber box 28 formed of a synthetic resin and is supported at its opposite ends by a pair of sockets 14b formed in the bracket 14. However, the boxes 28 may be formed of metal, glass or other suitable materials. Hence, the receiver panel 11 functions as a segmented solar energy collector which receives rays of solar energy concentrated by the modules 12 of the vee-trough concentrator.

Figure 2:
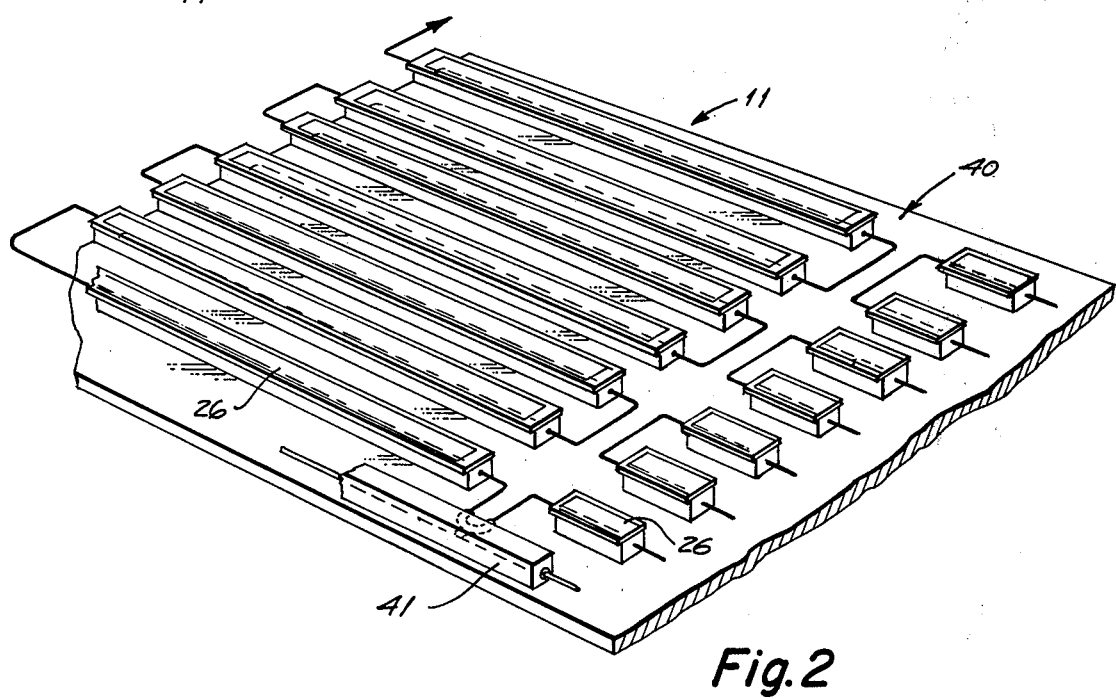
FIG. 2 is a perspective schematic view of a segmented receiver array which functions as a solar energy receiver within the collector system shown in FIG. 1.

Within each of the boxes 28 there is supported a length of finned absorber piping, generally designated 30. The piping 30 includes an absorber plate 32 upon which is seated a length of seamless tubing 34, the ends 36 of which project from the box 28 at each of the opposite ends thereof. As a practical matter, the ends 36 are connected in series so that the lengths of tubing 34, in effect, serve to form a conduit 40 of a serpentine configuration, FIG. 2, for coursing a working fluid, such as water, through the boxes 28 for picking up thermal energy. A manifold 41 is connected to deliver a working fluid to the conduit 40.

Where desired, the boxes 28 are provided with a layer 42 of suitable insulative materials which reduce heat loss through the walls of the boxes. In order to further enhance the overall efficiency of the system 10, the finned piping 30 is provided with a radiation absorptive coating of known materials.

Each of the boxes 28 is covered by a transparent cover 42 formed of glass of similar materials. Since the segments 26, when coupled in the system, reduce glass requirements by about two-thirds over conventional collector systems, antireflection coatings for the glass are used when desired. Additionally, use of glass of reduced thickness is facilitated through segmentation of the collector. If higher temperature heat recovery is desirable, two panes of glass covers may be used to reduce heat loss. Finally, where the system is to be employed in a domestic environment, such as in a neighborhood of dwellings, the glass may be replaced with transparent synthetic resins, in order to avoid breakage. However, the propensity of such materials to mar reduces the desirabililty of their usage.

In any event, it is to be understood that the segments 26 are positioned between the modules 12 in a manner such that incident solar energy is deflected toward and concentrated upon the covers 42 by the surfaces 16 and 18 of the modules 12. This energy is transferred to a working fluid flowing through the finned piping 30 of the conduit 40.

The system 10 is so oriented that the plane in which the sun's apparent motion occurs is perpendicular to the plane of the system at the equinoxes. The tilt of this plane is less, of course, that 90° for winter months but more that 90° for summer months. Early morning and late afternoon positions of the sun vary from the noon position of the sun to such an extent that a single symmetrical vee-trough reflector is not capable of maintaining a useful concentration factor for year-round operation, unless the tilt of the plane of the system 10 is adjusted at least twice a year, perferably at the equinoxes.

However, it has been found that by individually mounting the modules 12, in a manner such that the axes of the resulting vee-troughs lie in east-west directions, the need for tilt change for the system 10 with respect to latitude is eliminated because orientation of the modules 12 can be reversed for thus, in effect, changing the tilt of the aperture angles of the vee-trough reflectors.

The geometric concentration ration for a vee-trough, which can be defined as the area of the aperture at the top of the vee-trough between the tops of the modules 12, to the area of the bottom openings defined at the bottom of the vee-trough, between the bottoms of the modules, is constant. The actual concentration factor is the ratio of the concentrated solar radiation intensity at the bottom opening of a vee-trough to the flux at its aperture. If the aperture angle is varied in size, the year-round average concentration factor is affected. Smaller aperture angles, of course, tend to yield higher peak intensities during summer and winter, whereas larger aperture angles result in a more uniform year-round concentration factor distribution.

Figure 7:
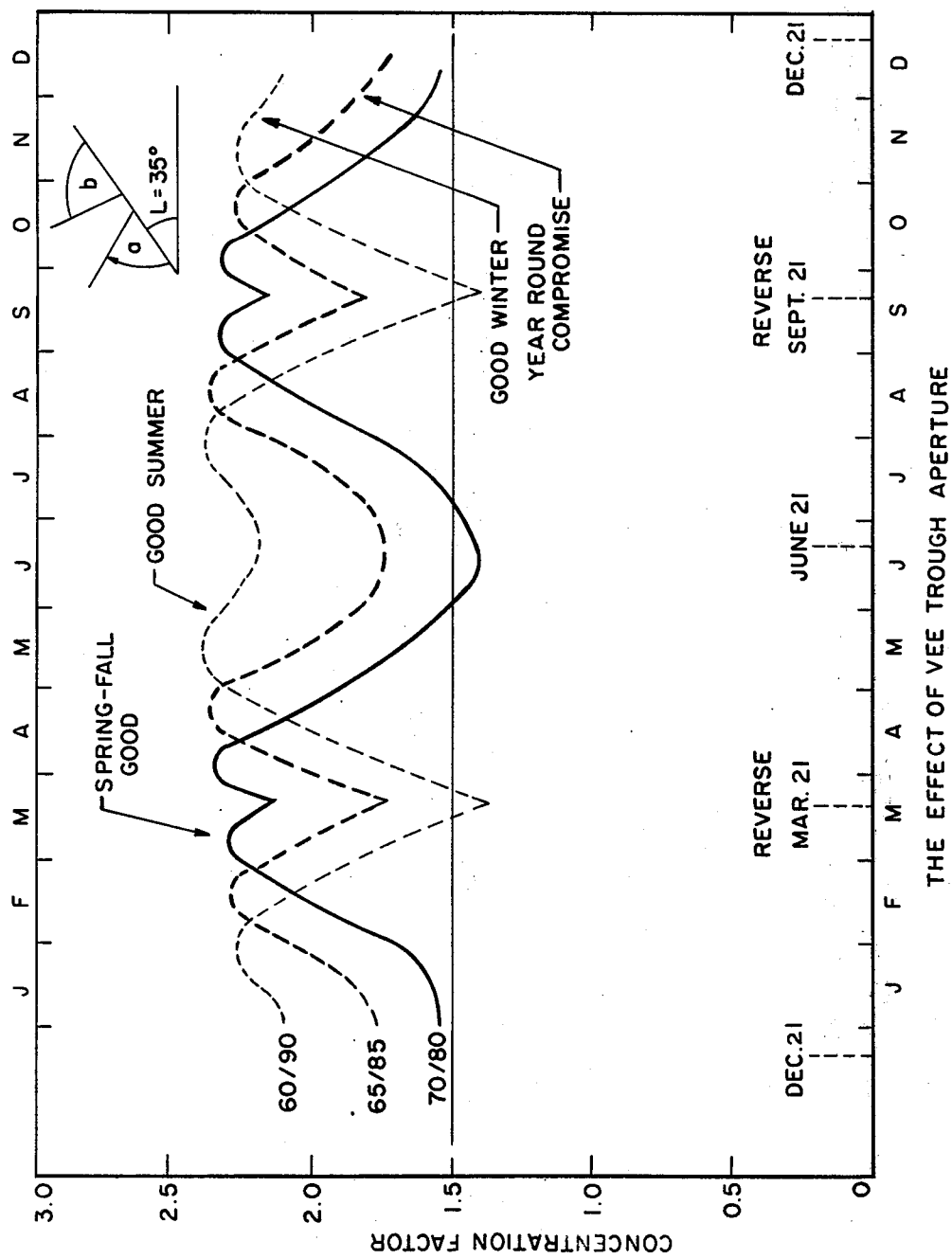
FIG. 7 is a graphic view illustrating the overall effectiveness, in terms of concentration factors, for different slope angles during various seasons.

Assuming that the angle L is the angle of latitude for a locality of use, the effect of the vee-trough reflector for different seasons can be established, through computation or empirically, as desired. For example, assume that the plates 13a and 13b, for surfaces 16 and 18, are so inclined as to establish a first included angle, designated angle a, at 60° and a second included angle, designated angle b, at 90°, respectively, the aperture angle will be 30° and the concentration factor will be above 2.0 during the summer and winter, but poor during the spring and fall seasons, as depicted in FIG. 7. Assuming angles a and b to be 65° and 85°, respectively, the aperture angle is still 30°, but the swing of the concentration factor is reduced throughout the year.

Although the concentration factor is not as good during the winter as in the summer, using angles a and b of 65° and 85°, respectively, it is somewhat better in the spring and fall than that achieved using angles of 60° and 90°. Going one step further, it is noted that where the angles are 70° and 80°, the concentration factor is particularly good during the spring and fall but very poor during winter and summer.

Therefore, it can be appreciated that compromise and trade-off can and should be utilized in determining the angles for the plates of the reflecting surface 16 and 18. Moreover, it is to be understood that the optimum angles for the planes of the reflecting surface 16 and 18 will vary as the angle of latitude L varies for various locations.

It is recommended that the modules 12 be reversed on the equinoxes in order to establish seasonal relationships for angles a and b as follows:

| (March 21 through Sept. 21) | | (Sept. 21 through March 21) | |
| --- | --- | --- | --- |
| Angle a | Angle b | Angle a | Angle b |
| 60 | 90 | 90 | 60 |
| 65 | 85 | 85 | 65 |
| 70 | 80 | 80 | 70 |

OPERATION

It is believed that in view of the foregoing description, the operation of the system of the instant invention is readily understood, however, in order to assure a complete understanding of the invention, the operation of the system 10 will be reviewed briefly at this point.

The system 10 of the instant invention preferably is mounted atop a roof, or similar planar surface, with the conduit 40 being connected to the manifold 41 which serves as a source of working fluid. The plane of the system 10 is tilted at an angle L equal to the angle of latitude of the system.

The modules 12 are mounted and disposed in an east-west orientation forming therebetween vee-troughs VT having desired aperture angles. Interspersed uniformly between the modules 12 are segments 26 of the panel 11 through the piping 30 of which flows a working fluid.

For the season beginning March 21 and ending September 21, the modules 12 are so arranged that the planes of the reflecting surfaces facing north define with the plane of the system an included acute angle substantially greater than the acute angle defined by the plane of the opposite reflecting surfaces and the plane of the system, FIG. 5B. Thus the aperture angles are caused to be tilted in a northerly direction. Hence, as the sun approaches the Tropic of Cancer and returns to the equator, the segments 26 are exposed to maximum diurnal radiation. The orientations of the modules 12 are reversed at the fall equinox, in order to reverse the tilt of the aperture angles, so that as the sun approaches the Tropic of Capricorn and returns to the equator, the segments 26 are exposed to maximum diurnal radiation. Reversal of the modules is facilitated by screws 22 and nuts 24.

In view of the foregoing, it should readily be apparent that the system of the instant invention provides a practical, lightweight, efficient, simple and inexpensive system, having a capability for capturing solar energy, whereby costs for converting solar energy to more useful forms are reduced.

Although the invention has been herein shown and described in what is conceived to be the most practical and preferred embodiment, it is recognized that departures may be made therefrom within the scope of the invention, which is not to be limited to the illustrative details disclosed.

What is claimed is:

1. A non-tracking solar energy collector system for heating a working fluid comprising:

A. a flat plate receiver including a plurality of uniformly spaced insulated boxes of elongated configurations disposed in mutual parallelism closed by a plurality of transparent cover panels, and a multiplicity of lengths of finned absorber piping disposed in said boxes and interconnected to form a conduit for conducting a working fluid through the receiver along a path of a serpentine configuration; and B. an energy concentrator disposed above the receiver for directing incident rays of solar energy on the boxes thereof including a plurality of juxtaposed reflector modules of a common asymmetrical cross-sectional configuration arranged in a uniform array, each reflector module being characterized by a pair of plates formed of a lightweight metal and having a pair of reflecting surfaces facing north-south directions and disposed in a pair of planes inclined at mutually distinct angles with respect to the plane of the flat plate receiver and intersecting above the plane of the receiver for defining therebetween an included angle equal to an included angle defined between intersecting planes of the plates of each pair of adjacent modules, and module support means for independently supporting said reflector modules including parallel straps having raised segments arranged in uniformly spaced relation for receiving therebetween said boxes and receiving thereon the opposite ends of said modules.

* * * * *